United States Patent [19]
Torkkola

[11] Patent Number: 5,959,966
[45] Date of Patent: Sep. 28, 1999

[54] METHODS AND APPARATUS FOR BLIND SEPARATION OF RADIO SIGNALS

[75] Inventor: Kari Torkkola, Chandler, Ariz.

[73] Assignee: Motorola, Inc., Schaumburg, Ill.

[21] Appl. No.: 08/867,645

[22] Filed: Jun. 2, 1997

[51] Int. Cl.[6] .................................................. H04J 4/00
[52] U.S. Cl. ........................................ 370/203; 370/334
[58] Field of Search ................................. 370/536, 542, 370/328, 203, 319, 320, 321, 329, 252, 334, 347; 455/450, 500, 501, 525, 456

[56] References Cited

U.S. PATENT DOCUMENTS

| | | | |
|---|---|---|---|
| 5,383,164 | 1/1995 | Sejnowski | 455/501 |
| 5,533,023 | 7/1996 | Ohlson et al. | 370/319 |
| 5,621,730 | 4/1997 | Kelley | 370/345 |
| 5,706,402 | 1/1998 | Bell | 706/22 |

OTHER PUBLICATIONS

"Separation of Narrowband Digital Communication Signals: A Maximum Likelihood Approach", First IEEE Signal Processing Workshop On Signal Processing Advances In Wireless Communications, Apr. 16–18, 1997, Paris, France, sponsored by The IEEE Signal Processing Society.
A. Bell and T. Sejnowski, "Fast Blind Separation Based On Information Theory", Proceedings of the Internal Symposium on Nonlinear Theory and Application (NOTLA), pp. 43–47, Las Vegas Nevada, Dec. 10–14, 1995.
A. Bell and T. Sejnowski, "An Information–Maximisation Approach To Blind Separation and Blind Deconvolution", Neural Computation, 7(6):1129–1159, Feb. 1995.
B.A. Pearlmutter and L.C. Parra, "A Context–Sensitive Generalization of ICA", International Conference on Neural Information Processing, Hong Kong, Sep. 24–27, 1996.

*Primary Examiner*—Chau Nguyen
*Assistant Examiner*—Kenneth Vanderpuye
*Attorney, Agent, or Firm*—Sharon K. Coleman; William E. Koch

[57] ABSTRACT

Multiple digital radio signals transmitted simultaneously at the same frequency are separated and the source signals recovered using blind source separation techniques. RF signals are received at a communications station (20) and downconverted to baseband signals. Blind Source Separation (BSS) based processes are applied to the baseband signals prior to demodulation to recover the source signals. To recover the source signals, a probability density function (PDF) model of the baseband source signal is generated (step 12) and an adaptation equation produced in accordance with the particular PDF model and BSS process (step 14). Using the known PDFs provides quicker adaptation to dynamic conditions. A separation matrix is learned by applying the adaptation equation to the baseband signals (step 16) and applied to the baseband signals to recover the source signals (step 18). Fading associated with mobile communications is overcome by using a sliding window of samples and updating a separation matrix sample by sample.

16 Claims, 1 Drawing Sheet

METHODS AND APPARATUS FOR BLIND SEPARATION OF RADIO SIGNALS

FIELD OF THE INVENTION

The present invention relates generally to methods and apparatus for separating signal sources and more specifically to the blind separation of multiple sources of radio signals.

BACKGROUND OF THE INVENTION

Radio frequency (RF) spectrum is a scarce resource. In the cellular or personal communications systems (PCS) environment an increasing number of users needs to be serviced at the same time avoiding simultaneous users interfering with each other. One way to pack multiple simultaneous users on the same frequency band is spatial division multiple access (SDMA). The purpose of SDMA is to separate the radio signals of interfering users (either intentional or accidental) from each others on the basis of the differing spatial characteristics of different user signals. One example of these characteristics is the arrival direction of the signal. The separation may be accomplished using an array of antennas at the basestation and filters attached to each antenna signal. The filters are learned on the basis of the user signals, rejecting unwanted signals while enhancing the desired signal.

These methods can be divided into two groups on the basis of whether they use training signals or not. Training signal methods typically use a variant of a least mean squares (LMS) algorithm to adapt the coefficients of the filters. This is usually a robust way of estimating the channel. One disadvantage of training signal methods, however, is that a large part of the signal needs to be wasted as predetermined training data. Further, the methods might not be fast enough for rapidly varying fading channels.

Unsupervised methods, methods not using training signals, rely on either information about the antenna array manifold or properties of the signals themselves. Mainstream unsupervised approaches are of the former type. Methods relying on antenna array manifold information often require calibrated antenna arrays, special array geometries, or they might also set serious limitations on the propagation environment. Less restrictive methods make use of the signal properties only. Some possible signal properties include constant modulus, finite alphabet, spectral self-coherence, cyclostationarity, or other statistical properties. Blind source separation (BSS) techniques typically are the least restrictive. BSS techniques rely only on source signal independence and non-Gaussianity assumptions. BSS denotes observing mixtures of independent sources, and by making use of these mixed signals only and nothing else, recovering the original or source signals.

The separation of independent sources from an array of sensors is a classic but difficult problem in signal processing. Generally, the signal sources as well as their mixture characteristics are unknown. Without knowledge of the signal sources, other than a general assumption that the sources are independent, the signal processing is commonly known in the art as the "blind separation of sources". The separation is "blind" because nothing is assumed about the independent source signals, nor about the mixing process.

A typical example of the blind separation of source signals is where the source signals are sounds generated by two independent sources, such as two (or more) separate speakers. An equal number of microphones (two in this example) are used to produce mixed signals, each composed as a weighted sum of the source signals. Each of the source signals is delayed and attenuated in some unknown amount during passage from the speaker to a microphone, where it is mixed with the delayed and attenuated components of the other source signals. Multi-path signals, generated by multiple reflections of the source signals, are further mixed with direct source signals. This is generally known as the "cocktail party" problem, since a person generally wishes to listen to a single sound source while filtering out other interfering sources, including multi-path signals.

Those skilled in the signal processing arts have been eager to solve blind source separation problems because of their broad application to many communication fields. In the cellular telecommunications art, for example, a receiver must eliminate interfering signals from neighboring cells (or the same cell in the case of SDMA) to avoid unacceptable levels of interference.

Generally, the art is concerned with a static linear signal mixing model. The art has been applied to separation of multiple audio, biomedical, and accelerometer signals; however, not to sources such as radio signals in a mobile environment that carry digital information. The art also assumes that the statistical properties of the signals remain stationary and that the mixing process remains stationary. The first assumption holds true in radio communications in general, but the latter assumption does not apply to mobile communications, which today forms a large portion of overall radio communications. The latter assumption does not apply to mobile communications because as the term suggests, in mobile communications the users are constantly moving causing nonstationary mixing conditions. There is thus a need for BSS methods that do not assume that the mixing process remains stationary.

In mobile communications the signals are subject to fading. Usually there is no direct line of sight from the transmitter to the receiver, only multiple reflected and diffracted signal components reach the receiver. For example, referring briefly to FIG. 2 obstacles, such as buildings 40, interfere with a signals path and create reflections. When either the receiver or the transmitter is moving, for example, in an urban environment, building reflections are changing very rapidly.

Thus methods for SDMA that are based on finding the directions of the mobile transmitters do not work in general, because these are the directions of just multiple reflections, and they vary rapidly. Thus there is a need for methods of separating radio signals that are not based on the concept of direction, but that work in a blind fashion.

If the phases of the carrier signals in the multipath components are aligned, the components add constructively at the receiver. If the phases of carriers are 180 degrees off, the components add destructively. Note that a difference of a half a wavelength of the carrier frequency in the distance between the transmitter and the receiver corresponds to a 180 degree phase shift. This is only about a half foot at 900 megahertz (Mhz). Because this small a difference in relative positions can cause the signal going from constructive interference to a null received signal, the result is that both the amplitude and the phase of the received signal vary seemingly randomly at a rate that is proportional to relative speeds of the transmitter and the receiver. The amplitude of the received signal follows a Rayleigh distribution, hence the name Rayleigh fading. For example, assuming 60 mph relative speed of the transmitter and the receiver, it only takes 5 milliseconds for the received signal to change from a peak of the amplitude into a deep fade, where the amplitude can be as much as 20 to 30 dB lower than at the peak.

Assuming a transmitted symbol rate of 20000 symbols/ second, this corresponds to a mere 100 received symbols during this change.

Accordingly, there exists a need for a blind separation method that can adapt to these rapidly changing conditions keeping up with the fading rate. Without the ability to adapt to rapidly changing conditions, BSS techniques will not be a feasible basis for SDMA in cellular communications.

BRIEF DESCRIPTION OF THE DRAWINGS

The present invention with be hereinafter described wherein like numerals denote like elements or steps.

DETAILED DESCRIPTION OF THE DRAWINGS

Generally, the present invention provides a method and an apparatus for blind source separation of radio signals. Specifically, the present invention provides a method and apparatus for applying BSS to radio signals that carry digital information. In accordance with one aspect of the present invention, simultaneous radio signals are transmitted from mobile sources in the same frequency band. Mixtures of the transmitted signals are received at a communications station where they are downconverted. In accordance with another aspect of the present invention, BSS techniques are applied to downconverted, complex-valued lowpass baseband signals to separate and recover the source signals. By making better use of the known signal properties, such as the probability density function of the signal, the present invention provides a process and apparatus that are capable of adapting to rapidly changing conditions and are capable of adapting much quicker than known processes which rely only on weak assumptions, such as source signal independence.

By making use of known signal properties, the present invention uses a modified or less blind BSS process. The present invention uses the knowledge of the type of signal being transmitted to simplify the separation process and make it adaptable to dynamic mixing conditions, e.g. mobile transmitters and/or receivers. More particularly, when designing a communications system, the particular application is known, e.g. a cellular application with digital RF signals and a particular modulation scheme. Knowing the modulation scheme by which the source signals are being transmitted in a digital system determines the symbol constellation (discussed further hereinbelow). Further, knowing the symbol constellation gives the PDF of the baseband source signals. Thus by making use of the known PDF, the present invention provides a BSS process and apparatus for recovering source signals transmitted from multiple mobile users.

Figure 1:
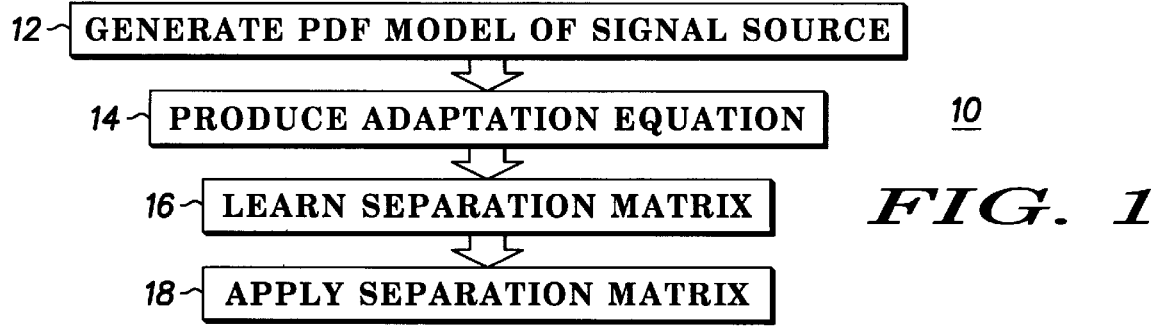
FIG. 1 is a flow diagram of a process of recovering a source signal in accordance with the present invention.

Referring to FIG. 1, a flow diagram 10 of a method for recovering at least one source signal from a plurality of mixed signals in accordance with the present invention is illustrated. In a first step 12, a Probability Density Function (PDF) model of the at least one source signal is generated. In a second step 14, an adaptation equation is produced in accordance with the PDF model and a BSS model. In a third step 16, a separation matrix is learned by applying the adaptation equation to the mixed signals. In a fourth step 18, the separation matrix is applied to the mixed signals to recover the at least one source signal.

More particularly, each mixed signal includes components of the at least one source signal and components of a plurality of other source signals. In accordance with the present invention, the method represented by flow diagram 10 separates the mixed signals and removes the components of the "other" mixed signals to recover the source signal. As those skilled in the art will appreciate, the present invention may suitably recover a single source signal or multiple source signals from the plurality of mixed signals. In other words, the process may for one, some, or all mixed signals, remove the components of the other mixed signals to recover the source signal(s).

In first step 12, generating the PDF model includes identifying an approximation of the PDF model, which approximation is everywhere differentiable. Further, in accordance with the present invention, the approximation includes a parameter that when such parameter is varied the approximation approaches the true PDF.

As described hereinabove, both the amplitude and the phase of the received signal of mobile users vary seemingly randomly at a rate that is proportional to relative speeds of the transmitter and the receiver. In addition to learning the separating or unmixing matrix, phase differences due to different distances from each transmitter to each receiver could be taken into account by learning individual delays as described in patent application Ser. No. 08/571,329 U.S. Pat. No. 5,675,659, filed Dec. 12, 1995, entitled "Methods and Apparatus for Blind Separation of Delayed and Filtered Sources", by the same applicant and assigned to the same assignee of the present application.

In applying BSS techniques to signals mixed with real valued coefficients, finding a nonlinear functions to match the PDF of the data is key. In the case of radio signals, for example in a cellular system having mobile users, because both the amplitude and the phase of the received signal vary, it is appropriate to use complex valued mixing and unmixing. Meaning, a preferred approach is to work with a complex valued mixing matrix. Accordingly, in accordance with an aspect of the present invention, BSS techniques are extended to radio signals mixed with complex valued coefficients. A complex number z=x+iy, can be written as $z=re^{i\theta}$, where i is the imaginary unit (the square root of minus one), r=|z| and θ=arg(z). Both the phase shift θ and the amplitude r of a mixing branch (a path from one transmitter to one of the sensors or antennas) can be incorporated in the same complex valued mixing coefficient.

Here, the main interest is in digital communications, whereby the binary (or n-ary) information is transmitted as discrete combinations of the amplitude and/or the phase of the carrier signal. After downconversion to the baseband, the instantaneous amplitude of the carrier can be observed as the length of a complex valued sample of the baseband signal, and the phase of the carrier is discernible as the phase angle of the same sample. Possible combinations of phase and amplitude that depend on the modulation method employed, are called symbol constellations. N-QAM (quadrature amplitude modulation) utilizes both the amplitude and the phase, whereby the baseband signals can only take one of N possible locations on a grid on the complex plane. In N-PSK (phase shift keying) the amplitude of the baseband signal stays constant, but the phase can take any of N discrete values. In DPSK (differential phase shift keying), the information is transmitted as the difference between phases of two consecutive symbols. The phase can thus take any value, and because the amplitude remains constant, the baseband signal distribution is a circle on the complex plane. DPSK signals will be discussed first, though everything is directly applicable to other circularly distributed baseband signals, such as PSK, or 4-QAM. Non-circularly distributed signals require slight modifications, which will be discussed later.

The model of the mixing we assume is the following $$x[n]=A[n]s[n]+v[n] \qquad \text{Equation 1}$$

where s is a complex-valued vector of source signals, v is a complex-valued vector of additive noise, A is a complex-valued scalar matrix, and x is a complex-valued vector of mixtures observed at a number of antennas, each at discrete time instant n. This is a valid model in narrowband communications. A further assumption is that the number of antenna elements equals the number of source signals. Although as those skilled in the art will appreciate, the present invention is readily applicable to more antennas than source signals by projecting the antenna signals into a signal subspace having dimensions of the number of source signals of interest in accordance with known methods. For the separation, the model is as follows:

$$u[n]=W[n]x[n] \qquad \text{Equation 2}$$

where W is the separating or unmixing matrix, and u is a vector of separated source signals, both at discrete time instant n. The task of blind separation is now to learn separation matrix W by observing only x.

A. J. Bell and T. J. Sejnowski have shown that a suitable criterion to learning separation matrix W is to maximize the information at the output passed through nonlinear functions that model the cumulative density functions (CDF) of the source signals, as discussed in "An information maximization approach to blind separation and blind deconvolution", Neural Computation, 7(6):1004–1034, 1995. To apply the information maximization BSS to DPSK signals, requires a nonlinear function that models the cumulative density function (CDF) of the data, the PDF of which is a unit circle. Further, this nonlinear function and its derivative need to be everywhere differentiable.

In the case of a circular complex distribution with uniformly distributed phase, there is only one important direction of deviation, namely, the radial direction. Thus, the phase of a complex sample can be ignored and concentration placed on length. A smooth CDF G for a circular distribution at the unit circle can be constructed using the hyperbolic tangent (tan h) function as $$G(z)=\tan h(w(|z|-1)) \qquad \text{Equation 3}$$

and the corresponding PDF, differentiated in the radial direction, that is, with respect to |z| is $$g(z) = \frac{\partial}{\partial |z|} \tanh(w(|z|-1)) = w(1-\tanh^2(w(|z|-1))) \qquad \text{Equation 4}$$

where z=x+iy is a complex-valued variable, and the parameter w controls the steepness of the slope of the tan h function.

As those skilled in the art will appreciate, it is not necessary to worry about the proper scaling of the above functions, i.e., that the PDF integrates to unity. Thus, the first multiplicative constant w can be left out of the definition of g. Scaling is not important for the purposes of using these functions as the nonlinearities in the information maximization BSS, as will be discussed hereinbelow. Note also that when the steepness w approaches infinity, the densities approach the ideal density of a DPSK source, the unit circle. In addition to using hyperbolic tangent, many other equally good choices are possible where the ideal density is reached as a limit of a parameter value. For example, the radial section of the circular "ridge" could be a Gaussian.

In second step 14, producing the adaptation equation includes selecting the BSS model from models such as an information maximization model, a maximum likelihood estimation model, or any other method or model that takes into account the PDF of the source signal. Producing the adaptation equation further includes inserting the approximation of the PDF model into the BSS model, and deriving the adaptation equation based on the BSS model selected.

The information maximization adaptation equation to learn the separating or unmixing matrix W using the natural gradient is $$\Delta W(\hat{y}u^T+I)W \qquad \text{Equation 5}$$

where $\hat{y}$ is a vector with following components $\hat{y}_i$:

$$\hat{y}_i = \frac{\partial}{\partial y_i} \frac{\partial y_i}{\partial u_i} \qquad \text{Equation 6}$$

and vector x denotes one time sample of the observed mixtures, u=Wx denotes a corresponding time sample of the separated sources, and $y_i$ is the nonlinear function approximating the CDF of the data, which is applied to each component of separated sources u.

The circular CDF $y_i=\tan h(w(|u_i|-1))$ can now be inserted into the information maximization adaptation equation to yield:

$$\begin{aligned}\hat{y}_i &= \frac{\partial}{\partial y_i} \frac{\partial}{\partial u_i} \tanh(w|z|-1)) \\ &= \frac{\partial}{\partial y_i}(w(1-\tanh^2(w|z|-1)))\frac{\partial |u_i|}{\partial u_i} \\ &= w\frac{u_i}{|u_i|}\frac{\partial}{\partial y_i}(1-y_i^2) \\ &= -2wy_i\frac{u_i}{|u_i|}\end{aligned} \qquad \text{Equation 7}$$

The above equation 7 makes use of the following relation for a complex number z:

$$\frac{\partial |z|}{\partial z} = \frac{z}{|z|} \qquad \text{Equation 8}$$

Yielding the final adaptation equation:

$$\Delta W \propto \left(I - 2\left(\frac{w_i \tanh(w_i(|u_i|-1))u_i}{|u_i|}\right)_i u^H\right)W \qquad \text{Equation 9}$$

where $(\cdot)_i$ denotes a vector with elements of varying i. Here, the transpose operator is replaced by the hermitian operator H, since complex data will be processed. In addition, a subscript to w has been added as these parameters can be learned, too. The appropriate adaptation equations for w are derived hereinafter.

B. A. Pearlmutter and L. C. Parra demonstrated that the exact same adaptation equation that Bell and Sejnowski derived by information maximization can be derived starting from an entirely different viewpoint, namely, the maximum likelihood approach to density estimation, as discussed in "A context-sensitive generalization of ICA", International Conference on Neural Information Processing, Hong Kong, Sep.

24–27, 1996. Given (or assuming) parametric forms of the densities of underlying source signals, the idea is to find what mixing matrix, when applied to source densities, is most likely to produce the observed mixture density. Alternatively, what unmixing matrix when applied to the observed mixture density, is most likely to produce the assumed source densities.

The distance between two densities can be measured by divergence $$G[p, \hat{p}] = \int p(x)\log\frac{p(x)}{\hat{p}(x; w)}dx = H[p] - \int p(x)\log\hat{p}(x; w)dx \qquad \text{Equation 10}$$

Here p(x) is a fixed PDF, and $\hat{p}(x;w)$ is a parametric PDF that can be varied an shaped by varying the parameter vector w. From the rightmost side of the equation we can see that the divergence equals the entropy of the fixed PDF p minus the likelihood of p given $\hat{p}$. Finding the parameters w (including the unmixing matrix) that minimize the divergence, maximize the likelihood of p given $\hat{p}$. Hence "maximum likelihood".

In the case of source separation, p(x) is the PDF of the observable mixture x and $\hat{p}(x;w)$ acts as the PDF constructed from single source PDFs using a current estimate of the unobservable mixing matrix $W^{-1}$. The purpose is now to find the mixing matrix, or actually its inverse, the separating or unmixing matrix, and the parameters of the individual source PDFs, such that p and $\hat{p}$ would be as much alike as possible, as measured by the divergence.

The next step is to derive a gradient ascent rule to update the current estimate of W and w that maximize the likelihood. As G is not directly available, Pearlmutter and Parra then proceed by taking the gradient of a sample of G which is $$\hat{G} = H[p] - \log \hat{p}(x;w) \qquad \text{Equation 11}$$

The straightforward derivation is not repeated herein, but the final adaptation equation is of the following form:

$$\Delta W \propto -\frac{d\hat{G}}{dW}W^T W = \left(\left(\frac{f_j'(uj; wj)}{f_j(uj; wj)}\right)_j u^T + I\right)W. \qquad \text{Equation 12}$$

where u=Wx are the sources separated from mixtures x, and $f_j(u_j;w_j)$ is the PDF of source j parametrized by $w_j$. This is exactly the form of Bell and Sejnowski when $f_j$ is taken to be the derivative of the necessary nonlinearity $g_j$, which was assumed to be "close" to the true CDF of the source. Thus, the information maximization approach of Bell and Sejnowski makes implicit assumptions about the CDFs of the sources in the form of the nonlinear squashing function and does implicit density estimation, whereas in the maximum likelihood approach of Pearlmutter and Parra, the density assumptions are made explicit. This fact makes it more lucid to derive the adaptation for other forms of densities using maximum likelihood, and also to extend maximum likelihood to complex-valued variables. Thus, in accordance with a preferred embodiment of the present invention, maximum likelihood based BSS is used to recover source signals from mixed signals.

Now, we can use the circular probability density functions as the densities $f_j$ (omitting scaling)

$$f_j(u_j; w_j) = 1 - \tanh^2(w_j(|u_j| - 1)) \qquad \text{Equation 13}$$

where the steepness $w_j$ acts as the single parameter of the density. Now we need to compute its derivative $$\begin{aligned}f_j'(u_j; w_j) &= \frac{\partial}{\partial u_j}f_j(u_j; w_j) \\ &= -2\tanh((w_j(|u_j|-1))\frac{\partial}{\partial u_j}\tanh(w_j(|u_j|-1)) \\ &= -2\tanh(w_j(|u_j|-1))(1-\tanh^2(w_j(|u_j|-1)))w_j\frac{\partial|u_j|}{\partial u_j} \\ &= -2\tanh(w_j(|u_j|-1))f_j(u_j; w_j)w_j\frac{u_j}{|u_j|}\end{aligned} \qquad \text{Equation 14}$$

Inserting this into the adaptation equation and changing transpose operators into hermitians yields $$\Delta W \propto \left(I - 2\left(\frac{w_j\tanh(w_j(|u_j|-1))u_j}{|u_j|}\right)_j u^H\right)W \qquad \text{Equation 15}$$

which is exactly the information maximization rule. Notice that at this time it was not necessary to consider or determine what would be an appropriate way to construct the CDF from the PDF for complex valued distributions, but the sole PDF was enough. Thus, the maximum likelihood approach is simpler to use for other, possibly not circular signal distributions, such as for the 16-QAM, where the baseband data is distributed as 16 points on a square lattice.

The adaptation equation for the parameter vector w of the PDF can also be derived by taking the gradient of $\hat{G}$ with respect to w. This will be $$\Delta w_j \propto \frac{\partial \hat{G}}{\partial w_j} = -\frac{\partial f_j(u_j; w_j)/\partial w_j}{f_j(u_j; w_j)} \qquad \text{Equation 16}$$

-continued $$= -\frac{\partial(1 - \tanh^2(w_j(|u_j| - 1)))/\partial w_j}{1 - \tanh^2(w_j(|u_j| - 1))}$$

$$= -\frac{-2\tanh(w_j(|u_j| - 1))(1 - \tanh^2(w_j(|u_j| - 1)))(|u_j| - 1)}{1 - \tanh^2(w_j(|u_j| - 1))}$$

$$= 2\tanh(w_j(|u_j| - 1))(|u_j| - 1)$$

So far, signals that lie on the unit circle or that have a constant modulus have been addressed. Now, other modulation techniques, in which the alphabet is constructed as discrete points on the complex plane will be addressed. An example is the QAM (quadrature amplitude modulation), in which the signal alphabet is a regular grid. For example, in 4-QAM, the alphabet could be $A_4=\{1+i, -1+i, -1-i, 1-i\}$, or any scaled version of $A_4$.

In the ideal PDF of 4-QAM, each symbol is represented just as a point. Again, a smoothed version of the ideal PDF can be constructed using, for example, the hyperbolic tangent, tan h, function. The contribution of each symbol located at $u_k$ in the complex plane can be represented as $$g_k(u) = 1 - \tan h^2(w_k|u - u_k|) \quad \text{Equation 17}$$

and the total PDF is the sum over all of the alphabet $$g(u) = \sum_k (1 - \tanh^2(w_k|u - u_k|)) \quad \text{Equation 18}$$

Again, by increasing w the ideal PDF will be approached. The density for each source j will be $$f_j(u_j; w_j) = \sum_k (1 - \tanh^2(w_k|u_j - u_k|)) \quad \text{Equation 19}$$

where $w_j$ is now a vector of parameters $w_k$. In practice each $w_k$ would be equal in which case a single parameter w will suffice.

This density function could now be inserted into the maximum likelihood adaptation rule resulting in the weight or coefficient update equation. However, because $f_j(u_j; w_j)$ is a sum of multiple components, f'/f will not have a particularly simple form. In essence, for each sample to be processed, all the components of the PDF of the constellation would require evaluation. This can be avoided by evaluating only the component of the PDF corresponding to that symbol of the alphabet $u_c$ which is nearest to the current separated sample u. This is a very good approximation when w is large. But the approximation does not even have to be a good one when w is small, because the whole purpose of using "wide" PDF components was to be able to evaluate the gradients on the whole complex plane.

Thus for the 4-QAM, the complex plane will be divided into 4 quadrants, each having its own adaptation rule corresponding to the single PDF component in that quadrant. Evaluating the adaptation equation for each component gives $$\Delta_k W \propto \left(I - 2\left(\frac{w_k \tanh(w_k|u_j - u_k|)u_j}{|u_j|}\right)_j u^H\right) W \quad \text{Equation 20}$$

for each symbol k of the alphabet or for the corresponding location $u_k$ on the complex plane. This equation can be applied as such when the baseband signal is sampled at the symbol rate. With oversampling, it may be necessary or desirable to also include the transition paths between the symbols in the PDF model.

In third step 16, learning separation matrix or unmixing matrix W comprises applying the adaptation equation to the mixed signals. Learning the separation matrix further comprises adjusting weights or coefficients of separation matrix W. More particularly, to apply the derived adaptation equations, separation matrix W must be initialized first, for example, to a unit matrix. Then as each sample of x is observed, the corresponding change to W could be computed, and W updated.

To avoid excessive computations and to be able to better vectorize the process, it is practical to accumulate ΔW from a number of samples before updating the W. This amounts to computing an expectation of ΔW over a number, for example, 10–500 samples of the mixtures. Looking at the adaptation equations for circularly distributed signals, the expectation of $|u_j|$ in the denominator equals one "near" convergence since we assume baseband signals that are distributed on the unit circle.

Also, near the solution, the separated outputs $u_j$ can be assumed to be close to true distributions, the exact unit circle, which can be derived from $f_j$ by increasing its steepness. At the limit, the tan h will equal the "sign" function (i.e. +1 or −1), when the whole adaptation, ignoring scaling, is $$\Delta W (I - 2(\text{sig } n(|u_i|-1)u_j)_j u^H)W \quad \text{Equation 21}$$

However, this simplification can only be used when the W is not too far off from the correct solution. This is especially true when the number of available samples of the mixtures is small. The smooth tan h is needed in the beginning of the adaptation to give the correct direction to the gradient in the algorithm.

In fourth step 18, separation matrix W is applied to the baseband mixed signals by multiplying the baseband mixed signals with separation matrix W to produce at least one source signal.

Figure 2:
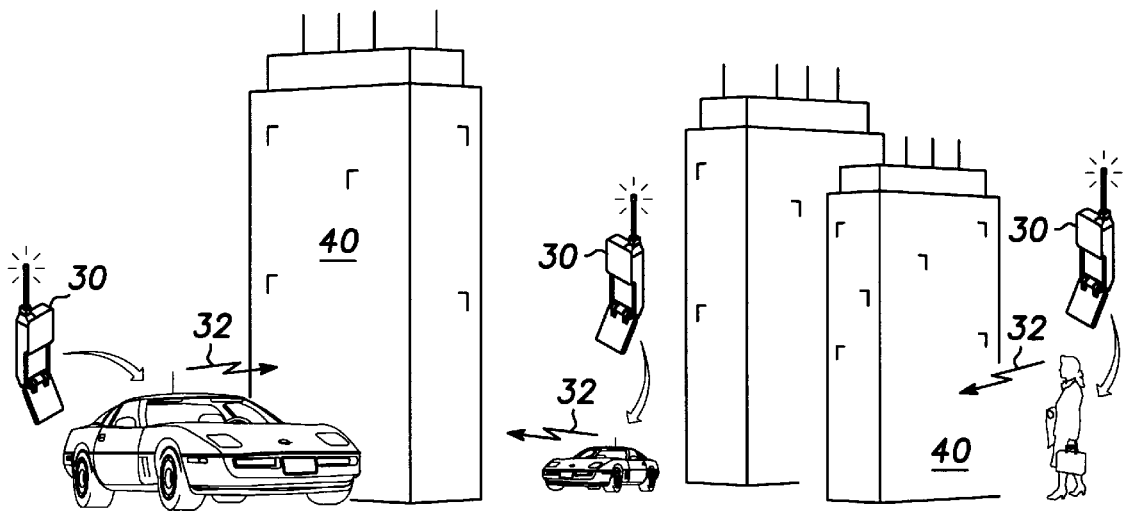
FIG. 2 is a block diagram of an apparatus for recovering a cellular communications source signal in accordance with the present invention.
Figure 2:
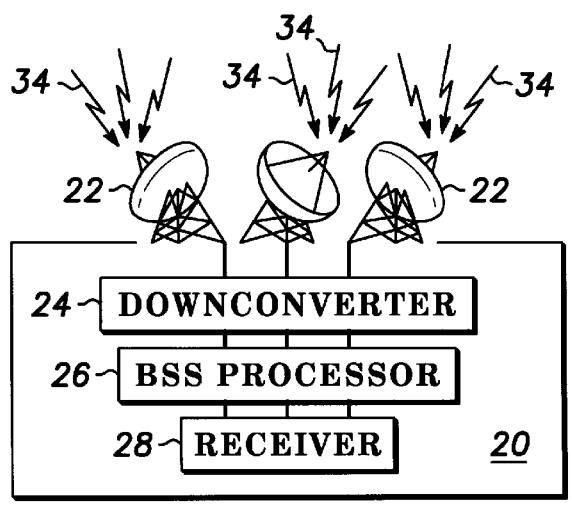

Referring now to FIG. 2, a cellular application in accordance with the present invention will be described. As shown in FIG. 2, a cellular application includes a plurality of mobile users 30 each transmitting a source signal 32. While traditionally each user transmitted at distinct frequencies, distinct times, or distinct codes, the present invention allows for simultaneous transmission of multiple users at the same frequency. A cellular application further includes a plurality of antenna elements 22 typically at a communications base station 20. In accordance with an aspect of the present invention, communications station 20 may be a stationary or mobile station.

Communications station 20 further comprises downconverter 24, BSS signal processor 26, and receiver 28. Radio signals 34 comprising a plurality of mixed signals are received by antennas 22 at communications station 20 and downcoverted via downconverter 24. The downconverted signals are transmitted to BSS signal processor 26 wherein the signals are processed in accordance with the present invention to yield the various source signals. The processed signals are then transmitted to receiver 28 wherein the signals are further processed in accordance with known digital radio receiver processes, for example, demodulation and detection.

More particularly, in accordance with the present invention, the plurality of antennas are coupled for receiving a plurality of mixed (RF) signals 34 resulting from a plurality of source signals 32 being transmitted from a plurality of cellular users 30. Downconverter 24 includes an input coupled to the plurality of antennas 22 and an output. In accordance with a preferred embodiment of the present invention, downconverter 24 downconverts the received mixed (RF) signals 34 to mixed baseband signals and outputs the mixed baseband signals to BSS processor 26. As those in the art will appreciate, because downconversion is a linear process, downconversion of linear mixtures of antenna signals produces linear mixtures of baseband signals. Signal processor 26 includes an input coupled to the output of downconverter 24 and an output. Processor 26 separates or unmixes the mixed baseband signals and outputs the separated baseband signals (recovered downconverted source signals) to receiver 28. In accordance with the present invention, the mixed baseband signals are separated prior to demodulation which introduces nonlinearities that would frustrate the BSS processes of the present invention. Receiver 28 is suitably coupled to the output of signal processor 26, wherein receiver 28 demodulates the received baseband signals and outputs the information or data of the source signal. More particularly, receiver 28 performs the standard functions associated with a digital radio signal receiver.

In accordance with another aspect of the present invention, the problems of fading signals are overcome by adapting quicker to the rapidly changing conditions of mobile communications. The present invention adapts quickly because the methods of the present invention require less data to adapt or process a change.

As previously noted, both the amplitude and the phase of the received signal of mobile users vary seemingly randomly at a rate that is proportional to relative speeds of the transmitter and the receiver. Because both the amplitude and the phase of the received signal vary, the present invention uses complex-valued mixing and unmixing. In accordance with the present invention, mixed signals can be oversampled, for example, by a factor of eight (8). The received sampled mixtures are $$xi[n] = \sum_j fij[n]sj[n] + ni[n] \qquad \text{Equation 22}$$

where $s_j[n]$ are the source signals, $f_{ij}[n]$ represents the fading from transmitter j to receiver i, and $n_i[n]$ represents the noise observed by receiver i at discrete time instances n. The fading coefficients, $f_{ij}[n]$, now form mixing matrix A[n] of Equation 1 which is constantly changing whereas the known art assumes mixing matrix A was constant.

To compensate for or overcome the effects of fading, a sliding window of N samples, for example, 80 samples, centered at the current sample is used. The separation matrix update (the gradient) is calculated using all the samples of the window, the separation matrix is updated, the window is slid one sample forward, and the same is repeated. Using this technique, the present invention can keep up with the fading rate corresponding to 60 mph relative speed of the transmitter and the receiver at a carrier frequency of 900 Mhz, symbol rate of 20 kilohertz (kHz), and signal oversampling of eight (8).

While we have discussed overcoming fading problems in the context of an 80 sample sliding window in which the window slid one (1) sample at a time, it should be understood that the window may slide two (2), three (3), or more samples at a time or the window may comprise more or less samples depending on the level of quality desired or the dynamic conditions of a particular application.

In accordance with an aspect of the present invention, the processes for adapting to rapidly changing conditions, such as fading, comprises selecting a set number of samples, e.g. 80, centered about a first individual sample for each of the plurality of baseband signals; learning a first separation matrix from the 80 samples; and applying the first separation matrix to at least the first individual sample. Once the first separation matrix is applied, the 80 sample window is slid forward and centered about a second individual sample. A second separation matrix is learned from the 80 window sample that is now centered about the second individual sample. The second separation matrix is then applied to at least the second individual sample and the process continues in like fashion. In accordance with another aspect of the present invention, the prior learned separation matrix, e.g. the first separation matrix, is used as the initial value for learning the subsequent matrix, e.g. the second separation matrix. By using a small window of samples, the present invention captures and adapts to rapid changes in the mixing conditions.

Although the whole field of blind source separation started around 1985, rather surprisingly, no application to radio communications has yet emerged. Most of the source separation processes are based on higher-order statistics, and these should be relatively straightforward to generalize for complex-valued baseband data. Perhaps the main reason is that all theoretical work has concentrated on the case of static mixing, not in the dynamic case. Many communications channels are dynamic in nature and thus, rapidly adapting methods are necessary.

Making use of all available knowledge of the sources, in this case the PDFs of the source signals, allows successful adaptation based on a very small number of samples, much smaller than by just incorporating the coarse shapes of the PDFs into a process such as the information maximization process of Bell and Sejnowski. Because the separation matrix can be learned from a smaller number of samples, the present invention is able to adapt to ongoing changes, such as mobile users, mobile receivers, fading, and the like, during the time the changes are happening. Thus, the methods and apparatus of the present invention can recover source signals that are subject to not only static mixing conditions but to dynamic mixing conditions and provide a BSS based process for SDMA.

By now it should be appreciated that the blind source separation methods and apparatus of the present invention can increase the capacity of a cellular system. By separating multiple simultaneous radio signals, the present invention allows for multiple users to simultaneously transmit at the same frequency within a given cell. The present invention my further be used to reduce interference from neighboring cells. Moreover, by providing methods and apparatus for separating multiple radio signals, the present invention makes it possible for neighboring cells to use the same frequencies, thereby increasing the available frequency spectrum, allowing for more users, and thus expanding the capacity of a cellular system.

I claim:

1. A process for recovering at least one source signal from a plurality of mixed signals, each mixed signal including components of the at least one source signal and components of a plurality of other source signals, comprising the steps of:

generating a Probability Density Function (PDF) model of the at least one source signal including identifying an approximation of the PDF model, which approximation is everywhere differentiable;

producing an adaptation equation in accordance with the PDF model and a Blind Source Separation (BSS) model;

learning a separation matrix having coefficients by applying the adaptation equation to the plurality of mixed signals; and applying the separation matrix to the plurality of mixed signals to recover the at least one source signal.

2. The process of claim 1 wherein the approximation includes a parameter w, that when said parameter w is varied, the approximation approaches the true PDF.

3. The process of claim 1 wherein the step of producing the adaptation equation includes:

selecting the BSS model from one of an information maximization model and a maximum likelihood estimation model;

inserting the approximation of the PDF model into the BSS model; and deriving the adaptation equation based on the BSS model selected.

4. The process of claim 1 wherein the steps of learning and applying comprise the steps of:

selecting a set number of samples centered about a first individual sample for each of the plurality of mixed signals;

learning a first separation matrix from the set number of samples centered about the first individual sample;

applying the first separation matrix to at least the first individual sample;

selecting the set number of samples centered about a second individual sample for each of the plurality of mixed signals;

learning a second separation matrix from the set number of samples centered about the second individual sample; and applying the second separation matrix to at least the second individual sample.

5. The process of claim 4 further comprising the step of using the first separation matrix as an initial value for learning the second separation matrix.

6. The process of claim 1 wherein the step of learning the separation matrix includes adjusting the coefficients of the separation matrix in accordance with the following equation:

$$\Delta W \propto \left(I - 2\left(\frac{w_j \tanh(w_j(|u_j| - 1))u_j}{|u_j|}\right)_j u^H\right) W$$

where:

w is a parameter which controls the steepness of the slope of the tanh function;

u is a vector of separated source signals;

j represents each source signal;

W is the separation matrix; and

H is the hermitian operator.

7. The process of claim 1 wherein the step of learning the separation matrix includes adjusting the coefficients of the separation matrix in accordance with the following equation:

$$\Delta W (I - 2(\text{sign}(|u_j| - 1)u_j)_j u^H) W$$

where:

u is a vector of separated source signals;

j represents each source signal;

W is the separation matrix; and

H is the hermitian operator.

8. The process of claim 1 wherein the step of learning the separation matrix includes adjusting the coefficients of the separation matrix in accordance with the following equation:

$$\Delta_k W \propto \left(I - 2\left(\frac{w_k \tanh(w_k |u_j - u_k|)u_j}{|u_j|}\right)_j u^H\right) W$$

for each symbol k of an alphabet and where:

w is a parameter which controls the steepness of the slope of the tan h function;

u is a vector of separated source signals;

j represents each source signal;

W is the separation matrix; and

H is the hermitian operator.

9. The process of claim 1 further comprising the step of generating PDF models of the plurality of other source signals.

10. The process of claim 1 wherein the step of applying the separation matrix comprises multiplying the mixed signals with the separation matrix.

11. A communication station comprising:

a plurality of antennas coupled for receiving a plurality of radio frequency (RF) signals subject to non-stationary mixing conditions;

at least one downconverter having an input coupled to the plurality of antennas and an output, wherein the at least one downconverter is coupled for receiving the plurality of RF signals and downconverting the plurality of RF signals to a plurality of mixed baseband signals;

a Blind Source Separation (BSS) signal processor having an input coupled to the output of the at least one downconverter and an output, wherein the BSS signal processor iteratively learns a separation matrix by applying an adaptation equation to the plurality of mixed baseband signals and applies the separation matrix to the plurality of mixed baseband signals and outputs at least one baseband source signal; and a receiver coupled to the output of the BSS signal processor.

12. A process for recovering at least one baseband source signal from a plurality of mixed signals, each mixed signal including components of the at least one source signal and components of a plurality of other source signals, comprising the steps of:

downconverting the plurality of mixed signals to baseband producing a plurality of mixed baseband signals, including the steps of producing baseband components of the at least one source signal and baseband components of a plurality of other source signals; and separating the plurality of mixed baseband signals to recover the at least one baseband source signal, including the steps of generating a Probability Density Function (PDF) model of that at least one baseband source signal, producing an adaptation equation in accordance with the PDF model and a Blind Source Separation (BSS) model, learning a separation matrix by applying the adaptation equation to the plurality of baseband mixed signals, and applying the separation matrix to the plurality of baseband mixed signals to recover the at least one baseband source signal.

13. The process of claim 12 wherein the step of learning comprises iteratively learning the separation matrix for each time sample of a plurality of time samples which comprise the plurality of mixed baseband signals.

14. A method of recovering a plurality of mobile source signals from a plurality of mixed digital radio frequency (RF) signals, each mixed digital RF signal including components of the plurality of source signals, the method comprising the steps of:

downconverting the plurality of mixed digital RF signals to a plurality of mixed digital baseband signals;

generating Probability Density Function (PDF) models of the plurality of source signals;

iteratively learning a separation matrix by applying an adaptation equation based on the PDF models and a maximum likelihood estimation model; and multiplying the separation matrix with the mixed digital baseband signals to recover the plurality of source signals.

15. The method of claim 14 wherein the steps of iteratively learning and multiplying comprise the steps of:

selecting a set number of samples centered about a first individual sample for each of the plurality of mixed baseband signals;

learning a first separation matrix from the set number of samples centered about the first individual sample;

multiplying at least the first individual sample with the first separation matrix to produce a first sample of the plurality of source signals;

selecting the set number of samples centered about a second individual sample for each of the plurality of mixed baseband signals;

learning a second separation matrix from the set number of samples centered about the second individual sample; and multiplying at least the second individual sample with the second separation matrix to produce a second sample of the plurality of source signals.

16. The process of claim 15 further comprising the step of using the first separation matrix as an initial value for learning the second separation matrix.

* * * * *